United States Patent
Minemura et al.

(10) Patent No.: US 9,650,040 B2
(45) Date of Patent: May 16, 2017

(54) COLLISION MITIGATION APPARATUS

(71) Applicant: DENSO CORPORATION, Kariya, Aichi-pref. (JP)

(72) Inventors: Akitoshi Minemura, Nishio (JP); Norio Tsuchida, Kariya (JP)

(73) Assignee: DENSO CORPORATION, Kariya, Aichi-pref (JP)

(*) Notice: Subject to any disclaimer, the term of this patent is extended or adjusted under 35 U.S.C. 154(b) by 110 days.

(21) Appl. No.: 14/275,125

(22) Filed: May 12, 2014

(65) Prior Publication Data

US 2014/0343749 A1 Nov. 20, 2014

(30) Foreign Application Priority Data

May 14, 2013 (JP) .................... 2013-102316

(51) Int. Cl.
*B60W 30/09* (2012.01)
*B60W 30/08* (2012.01)
(Continued)

(52) U.S. Cl.
CPC ............ *B60W 30/08* (2013.01); *B60W 10/18* (2013.01); *B60W 10/20* (2013.01); *B60W 30/09* (2013.01);
(Continued)

(58) Field of Classification Search
CPC ...... B60W 10/18; B60W 10/20; B60W 30/08; B60W 30/09; B60W 30/0953;
(Continued)

(56) References Cited

U.S. PATENT DOCUMENTS

2006/0155469 A1* 7/2006 Kawasaki ............ B60R 21/013
   701/301
2007/0109110 A1 5/2007 Ohmura et al.
(Continued)

FOREIGN PATENT DOCUMENTS

DE          102 58617        4/2004
DE     10 2009 057836        6/2011
(Continued)

OTHER PUBLICATIONS

Extended European search report including the European search opinion, dated May 19, 2015, issued in the corresponding European application No. 14166950.7.
(Continued)

*Primary Examiner* — John Q Nguyen
*Assistant Examiner* — Nadeem Odeh
(74) *Attorney, Agent, or Firm* — Harness, Dickey & Pierce, P.L.C.

(57) ABSTRACT

A collision mitigation apparatus includes an object detecting section for detecting a collision object present in front of an own vehicle on which the collision mitigation apparatus is mounted, a drive assisting section that performs drive assist for avoiding a collision between the collision object detected by the object detecting section and the own vehicle or mitigates damage to the own vehicle due to the collision, an operation state detecting section for detecting an operation state of the own vehicle, and a timing setting section for setting start timing to start the drive assist by the drive assisting section in accordance with the operation state detected by the operation state detecting section.

9 Claims, 9 Drawing Sheets

|  |  | DRIVE ASSIST OBJECT ||||||||
|  |  | STATIONARY OBJECT |||| PRECEDING OBJECT || ONCOMING OBJECT ||
|  |  | VEHICLE | PEDESTRIAN | OTHERS | CROSSING | VEHICLE | PEDESTRIAN | VEHICLE | PEDESTRIAN |
| --- | --- | --- | --- | --- | --- | --- | --- | --- | --- |
| BASE TABLE |  | A-1 | B-1 | C-1 | D-1 | E-1 | F-1 | G-1 | H-1 |
| OPERATING STATE | STRAIGHT STEERING OPERATION | A-2 | B-2 | C-2 | D-2 | E-2 | F-2 | G-2 | H-2 |
|  | WOBBLING STEERING OPERATION | A-3 | B-3 | C-3 | D-3 | E-3 | F-3 | G-3 | H-3 |
|  | CONSTANT STEERING OPERATION | A-4 | B-4 | C-4 | D-4 | E-4 | F-4 | G-4 | H-4 |
|  | TURNING ANGLE INCREASING OPERATION | A-5 | B-5 | C-5 | D-5 | E-5 | F-5 | G-5 | H-5 |
|  | BRAKING OPERATION | A-6 | B-6 | C-6 | D-6 | E-6 | F-6 | G-6 | H-6 |
|  | BLINKING OPERATION | A-7 | B-7 | C-7 | D-7 | E-7 | F-7 | G-7 | H-7 |
|  | ... | ... | ... | ... | ... | ... | ... | ... | ... |
| RUNNING STATE | RELATIVE SPEED ≥ X | A-8 | B-8 | C-8 | D-8 | E-8 | F-8 | G-8 | H-8 |
|  | ... | ... | ... | ... | ... | ... | ... | ... | ... |
| RUNNING ENVIRONMENT | CURVE AHEAD | A-9 | B-9 | C-9 | D-9 | E-9 | F-9 | G-9 | H-9 |
|  | WHITE LINE RECOGNIZED | A-10 | B-10 | C-10 | D-10 | E-10 | F-10 | G-10 | H-10 |
|  | ... | ... | ... | ... | ... | ... | ... | ... | ... |

(51) Int. Cl.
  *B60W 10/18* (2012.01)
  *B60W 10/20* (2006.01)
  *B60W 30/095* (2012.01)
  *B60W 30/18* (2012.01)
  *B60W 50/00* (2006.01)

(52) U.S. Cl.
  CPC ... *B60W 30/0953* (2013.01); *B60W 30/18145* (2013.01); *B60W 2050/0062* (2013.01); *B60W 2540/18* (2013.01); *B60W 2550/10* (2013.01); *B60W 2550/30* (2013.01)

(58) Field of Classification Search
  CPC ... B60W 30/18145; B60W 2050/0062; B60W 2540/12; B60W 2540/18; B60W 2540/20; B60W 2550/10; B60W 2550/30
  USPC .................................................... 701/1, 301
  See application file for complete search history.

(56) References Cited

U.S. PATENT DOCUMENTS

| | | |
|---|---|---|
| 2009/0037055 A1 | 2/2009 | Danner et al. |
| 2009/0248270 A1* | 10/2009 | Sekiguchi ............ B60W 10/06 701/96 |
| 2012/0035846 A1* | 2/2012 | Sakamoto ............ B60T 8/17558 701/301 |
| 2013/0024075 A1* | 1/2013 | Zagorski ................ G08G 1/166 701/46 |
| 2015/0206435 A1* | 7/2015 | Ouchi .................... G08G 1/166 340/903 |

FOREIGN PATENT DOCUMENTS

| | | |
|---|---|---|
| DE | 10 2010 049351 | 4/2012 |
| DE | 10 2012 012591 | 12/2012 |
| JP | 2005-158012 | 6/2005 |
| JP | 2006-099715 | 4/2006 |
| JP | 2007-137126 | 6/2007 |
| JP | 2009-121957 | 6/2009 |
| JP | 2012-103969 | 5/2012 |
| JP | 2012-180055 | 9/2012 |
| WO | 2012/042358 | 4/2012 |

OTHER PUBLICATIONS

Office Action dated Mar. 31, 2015 in corresponding Japanese Application No. 2013-102316.

* cited by examiner

FIG.7

| | | DRIVE ASSIST OBJECT | | | | | | | | |
|---|---|---|---|---|---|---|---|---|---|---|
| | | STATIONARY OBJECT | | | | PRECEDING OBJECT | | ONCOMING OBJECT | | |
| | | VEHICLE | PEDESTRIAN | OTHERS | CROSSING | VEHICLE | PEDESTRIAN | VEHICLE | PEDESTRIAN |
| BASE TABLE | | A-1 | B-1 | C-1 | D-1 | E-1 | F-1 | G-1 | H-1 |
| OPERATING STATE | STRAIGHT STEERING OPERATION | A-2 | B-2 | C-2 | D-2 | E-2 | F-2 | G-2 | H-2 |
| | WOBBLING STEERING OPERATION | A-3 | B-3 | C-3 | D-3 | E-3 | F-3 | G-3 | H-3 |
| | CONSTANT STEERING OPERATION | A-4 | B-4 | C-4 | D-4 | E-4 | F-4 | G-4 | H-4 |
| | TURNING ANGLE INCREASING OPERATION | A-5 | B-5 | C-5 | D-5 | E-5 | F-5 | G-5 | H-5 |
| | BRAKING OPERATION | A-6 | B-6 | C-6 | D-6 | E-6 | F-6 | G-6 | H-6 |
| | BLINKING OPERATION | A-7 | B-7 | C-7 | D-7 | E-7 | F-7 | G-7 | H-7 |
| | ... | ... | ... | ... | ... | ... | ... | ... | ... |
| RUNNING STATE | RELATIVE SPEED ≥ X | A-8 | B-8 | C-8 | D-8 | E-8 | F-8 | G-8 | H-8 |
| | ... | ... | ... | ... | ... | ... | ... | ... | ... |
| RUNNING ENVIRONMENT | CURVE AHEAD | A-9 | B-9 | C-9 | D-9 | E-9 | F-9 | G-9 | H-9 |
| | WHITE LINE RECOGNIZED | A-10 | B-10 | C-10 | D-10 | E-10 | F-10 | G-10 | H-10 |
| | ... | ... | ... | ... | ... | ... | ... | ... | ... |

COLLISION MITIGATION APPARATUS

This application claims priority to Japanese Patent Application No. 2013-102316 filed on May 14, 2013, the entire contents of which are hereby incorporated by reference.

BACKGROUND OF THE INVENTION

1. Field of the Invention

The present invention relates to a collision mitigation apparatus for avoiding collision of a vehicle or mitigating collision damage to the vehicle.

2. Description of Related Art

There is known a collision mitigation apparatus which detects a collision object present in front of a vehicle using a sensor such as camera or a radar, and performs drive assists including giving an alarm and actuating a brake.

For example, Japanese Patent Application Laid-open No. 2012-103969 describes such a collision mitigation apparatus which is designed to calculate a risk level of collision with a detected obstacle, and give a warning if the calculated risk level is high. This collision mitigation apparatus is capable of giving a warning only when it is necessary.

However, if such drive assists are given to a vehicle driver when the vehicle driver correctly perceives the scene in front of the vehicle and definitely understands how the vehicle should be driven, the vehicle driver may be annoyed.

Further, when the vehicle is running on a winding road or a curved road, it may occur that an object outside the road is detected to be a collision object present in front of the vehicle, as a result of which drive assists for avoiding a collision are performed unnecessarily, causing the vehicle driver to be annoyed.

SUMMARY

According to an exemplary embodiment, there is provided a collision mitigation apparatus including:

an object detecting section for detecting a collision object present in front of an own vehicle on which the collision mitigation apparatus is mounted;

a drive assisting section that performs drive assist for avoiding a collision between the collision object detected by the object detecting section and the own vehicle, or mitigates damage to the own vehicle due to the collision;

an operation state detecting section for detecting an operation state of the own vehicle; and a timing setting section for setting start timing to start the drive assist by the drive assisting section in accordance with the operation state detected by the operation state detecting section.

According to the exemplary embodiment, there is provided a collision mitigation apparatus capable of suppressing drive assist from being unnecessarily performed to prevent a vehicle driver from being annoyed.

Other advantages and features of the invention will become apparent from the following description including the drawings and claims.

BRIEF DESCRIPTION OF THE DRAWINGS

In the accompanying drawings:

FIG. 7 is a diagram showing an example of a TTC map;

PREFERRED EMBODIMENTS OF THE INVENTION

Figure 1:
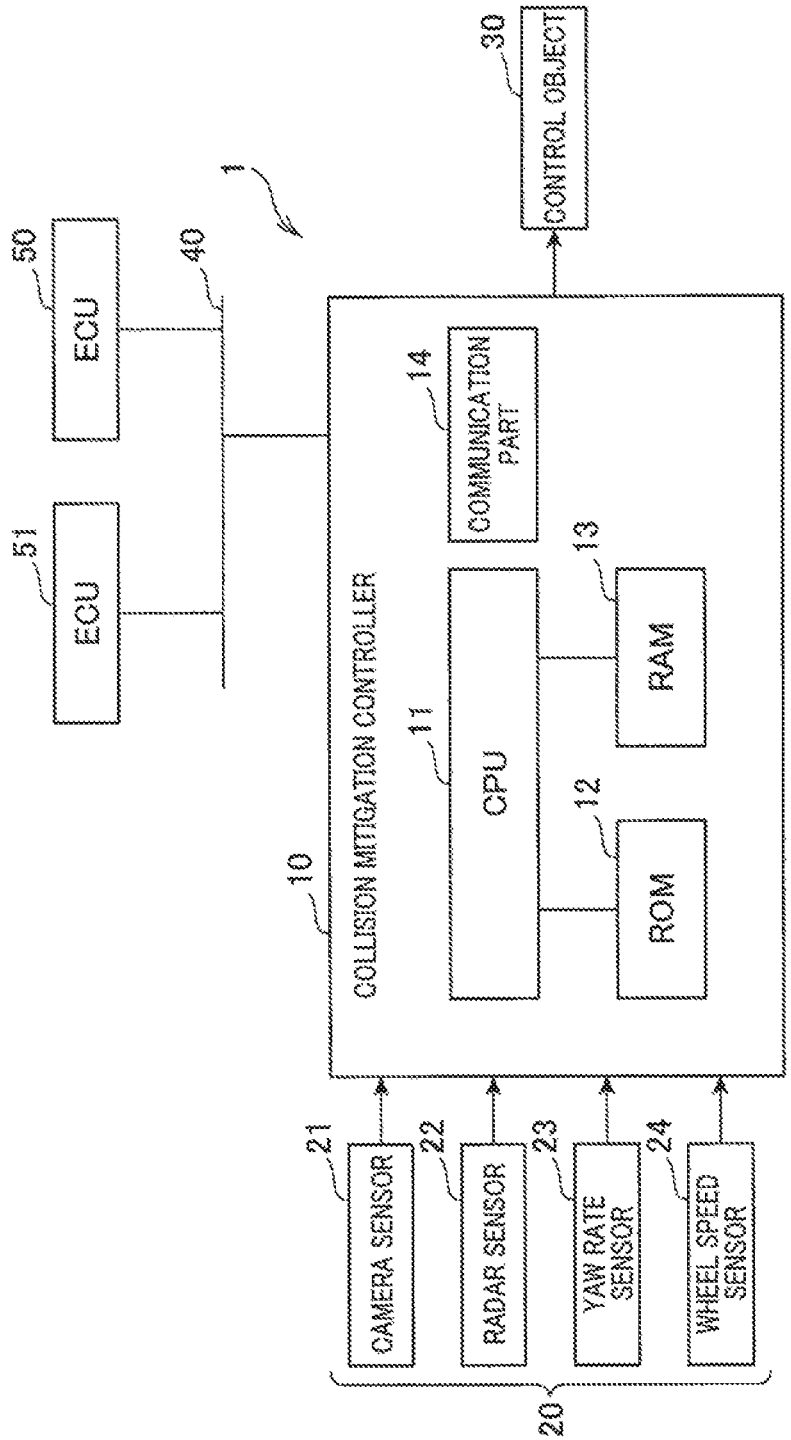
FIG. 1 is a block diagram showing the structure of a PCS (precrash safety system) as a collision mitigation apparatus according to an embodiment of the invention.

A PCS (precrash safety system) 1 as a collision mitigation apparatus according to an embodiment of the invention is a system mounted on a vehicle (may be referred to as the own vehicle hereinafter) to avoid collision of the own vehicle or mitigate collision damage to the own vehicle by performing drive assists such as giving a warning or actuating a brake device if there is a high risk of collision between the own vehicle and a collision object. The PCS 1 includes a collision mitigation controller 10, various sensors 20 and a control object 30 (see FIG. 1).

The sensors 20 include a camera sensor 21, a radar sensor 22, a yaw-rate sensor 23 and a wheel speed sensor 24. The camera sensor 21, which is a stereo camera capable of range finding in this embodiment, recognizes the shape of and the distance to a collision object such as a pedestrian, an on-road obstacle or a vehicle based on taken images.

The radar sensor 22 emits a directional electromagnetic wave toward a collision object, and receives a reflected version of the directional electromagnetic wave to recognize the position of the collision object relative to the own vehicle together with its shape and size.

The yaw-rate sensor 23 detects the turning angular velocity of the own vehicle. The wheel speed sensor 24 detects the wheel rotational speed as the speed of the own vehicle.

Detection results of these sensors 20 are received by the collision mitigation controller 10. Incidentally, each of the camera sensor 21 and the radar sensor 22 performs a process for detecting a collision object present in front of the own vehicle at a predetermined period (100 ms, for example).

The collision mitigation controller 10 includes a Central Processing Unit 11, a ROM 12, a RAM 13 and a communication part 14 for communication with other devices such as ECUs 50 and 51 mounted on the own vehicle through an in-vehicle LAN 40. The CPU 11 of the collision mitigation controller 10 executes programs stored in the ROM 12 in accordance with the detection results received from the sensors 20, to thereby perform various processes explained later.

The collision mitigation controller 10 actuates the control object 30 depending on a result of detection of a collision object. The control object 30 may be a brake device, a steering device, an actuator for driving a seat belt device, and a warning device.

Next, an operation of the PCS 1 is explained. The PCS 1 recognizes the type (vehicle, pedestrian, bike, motorbike, and so on) of a collision object in front of the own vehicle together with its relative position, relative speed, size and shape using the camera sensor 21 or the radar sensor 22.

The PCS 1 also estimates a TTC (time to collision) indicating a time remaining before collision for each detected collision object based on its relative position and relative speed. If the TTC reaches an operation threshold, the PCS 1 performs various drive assists through the control object 30, such as generation of a warning signal, actuation of the brake device, intervention to a steering operation of the vehicle driver, or tensioning of the seatbelts.

The operation threshold is variably set in accordance with the operation state of the own vehicle, the kind of a collision object, the positional relationship between the collision object and the own vehicle, the running state of the own vehicle, the running environment of the own vehicle and so on.

The PCS 1 sets the operation threshold such that timing to start drive assist is to be later when the own vehicle is steered not to run straight compared to when the own vehicle is steered to run straight. Also, the PCS 1 sets the operation threshold such that timing to start drive assist is set to be later when the blinker of the own vehicle is in operation compared to when the blinker is not in operation.

Figure 2:
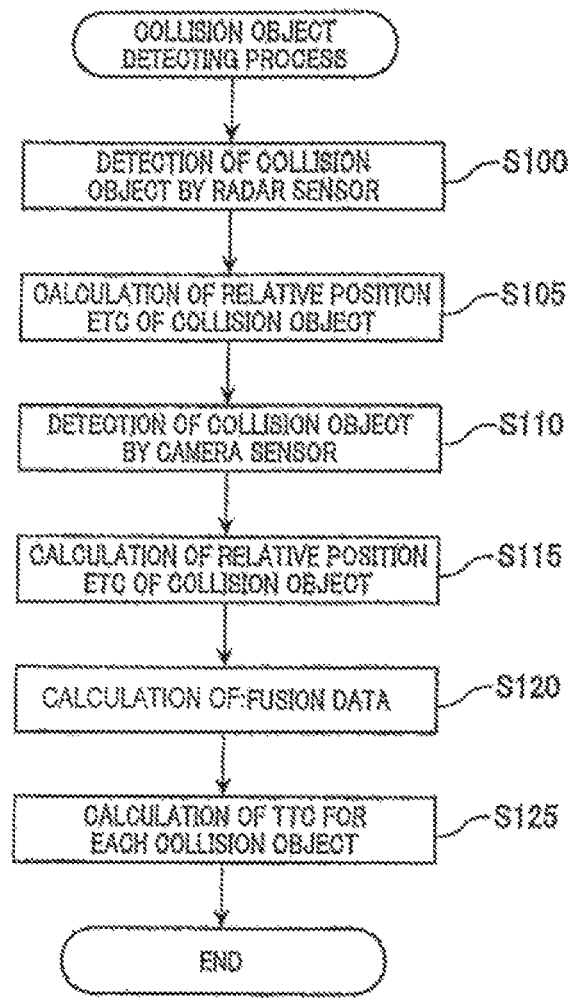
FIG. 2 is a flowchart showing steps of a collision object detecting process performed by the PCS.

Next, a collision object detecting process is explained with reference to the flowchart of FIG. 2. The collision object detecting process is performed periodically for detecting a collision object present in front of the own vehicle.

The collision object detecting process begins in step S100 where the collision mitigation controller 10 causes the radar sensor 22 to emit the directional electromagnetic wave and receive a reflected version of the directional electromagnetic wave. In subsequent step S105, the collision mitigation controller 10 detects a collision object(s) based on the received reflected version of the directional electromagnetic wave, and calculates the relative position (the distance from the own vehicle and lateral position relative to the own vehicle) of each collision object. Further, the collision mitigation controller 10 recognizes the size and shape of each collision object. Thereafter, the process proceeds to step S110.

Incidentally, if a collision object once detected has not been detected by the radar sensor 22, the collision mitigation controller 10 estimates the present relative position of this collision object by interpolation of data representing the past relative positions of this collision object, as long as the number of continuous cycles in which the radar sensor 2 failed to detect this collision object is smaller than a predetermined number.

In step S110, the collision mitigation controller 10 receives an image taken by the camera sensor 21, and then the process proceeds to step S115. In step S115, the collision mitigation controller 10 performs image processing on the taken image to extract an area(s) in each of which a collision object is present, and calculates the relative position (the distance and direction from the own vehicle) of each collision object. Further, the collision mitigation controller 10 recognizes the size and shape of each collision object, and determines the kind of each collision object by pattern matching or the like. Thereafter, the process proceeds to step S120.

Incidentally, if a collision object once detected has not been detected by the camera sensor 21, the collision mitigation controller 10 estimates the present relative position of this collision object by interpolation of data representing the past relative positions of this collision object, as long as the number of continuous frames in which the camera sensor 21 failed to detect this collision objected is smaller than a predetermined number.

Figure 3:
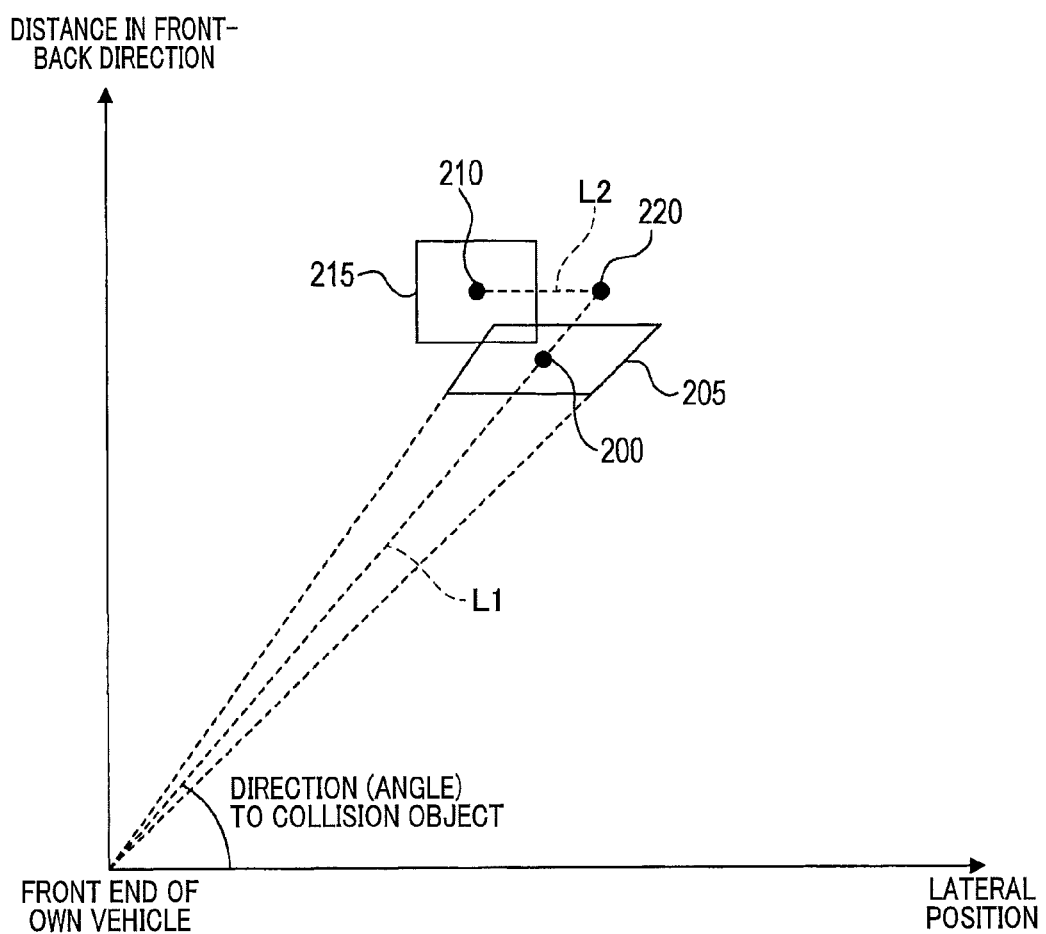
FIG. 3 is a flowchart showing steps of a method of generating fusion data performed by the PCS.

In step S120, the collision mitigation controller 10 calculates fusion data representing more accurately a relative position (referred to as the fine position hereinafter) of each collision object based on its relative position obtained by the radar sensor 22 and its relative position obtained by the camera sensor 21. More specifically, as shown in FIG. 3, the collision mitigation controller 10 sets a straight line L1 connecting the position of the own vehicle and the relative position 200 of a detected collision object determined from its relative distance and relative direction obtained by the camera sensor 21, and sets a straight line L2 extending laterally from the relative position 210 of the collision object determined from its relative distance and relative position obtained by the radar sensor 21. The collision mitigation controller 10 determines the intersection point of these straight lines L1 and L2 as the fine relative position of the collision object (fusion data).

Further, the collision mitigation controller 10 sets, as a radar detection area 215, a rectangular area having a predetermined size and centered around the relative position of the collision object obtained by the radar sensor 22. Thereafter, the collision mitigation controller 10 sets a circular sector area having a predetermined central angle and centered around the center of the front end of the own vehicle, the center line of the circular sector area extending to the direction of the relative position of the collision objet obtained by the camera sensor 21, and sets also a band-shaped area which extends laterally and on whose center in the front-back direction the relative position of the collision object obtained by the camera sensor 21 lies. The collision mitigation controller 10 sets the overlapped portion between these two areas as a camera detection area 205.

Subsequently, the collision mitigation controller 10 calculates the area of the overlapped portion between the radar detection area 215 and the camera detection area 205. If the calculated area is larger than or equal to a predetermined value, drive assist is carried out depending on the fusion data representing the fine relative position of the collision object.

If the collision object has been detected by only one of the radar sensor 22 and the camera sensor 21, or if the above calculated area is smaller than the predetermined value, drive assist is carried out depending on the relative position of the collision object obtained by the radar sensor 22 or the camera sensor 21.

In subsequent step S125, the collision mitigation controller 10 calculates the TTC for each collision object by dividing the distance between the collision object and the own vehicle by the relative speed of the collision object, for example.

Figure 4:
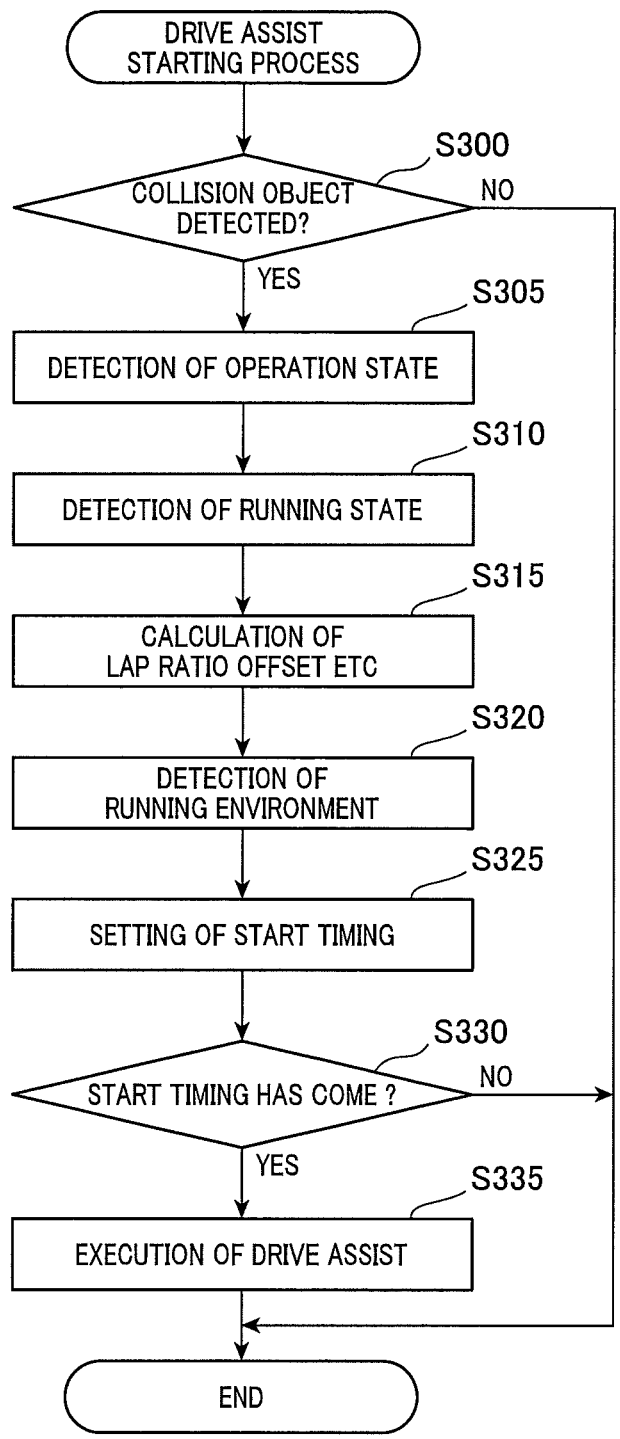
FIG. 4 is a flowchart showing steps of a drive assist starting process performed by the PCS.

Next, a drive assist starting process for setting start timing to start drive assist for each collision object and starting drive assist when the start timing comes is explained with reference to the flowchart of FIG. 4. This process is performed periodically.

The drive assist starting process begins in step S300 where the collision mitigation controller 10 determines whether or not a collision object has been detected. If the determination result in step S300 is affirmative, the process proceeds to step S305, and otherwise is terminated.

In step S305, the collision mitigation controller 10 detects the operation states of the steering wheel, brake device and blinker of the own vehicle. More specifically, if the amount of variation per unit time of the yaw rate detected by the yaw rate sensor 23 is larger than a predetermined threshold, the collision mitigation controller 10 determines that the steering angle of the own vehicle is wobbling, that is, a wobbling steering operation is underway.

Further, if the absolute value of the yaw rate remains larger than a predetermined threshold for longer than a predetermined time, the collision mitigation controller 10 determines that the steering angle of the own vehicle is kept at a certain angle larger than a predetermined threshold, that is, a constant steering angle operation is underway.

Further, if the increase or decrease amount per unit time of the yaw rate is larger than a predetermined value, the collision mitigation controller 10 determines that the increase or decrease rate of the steering angle of the own vehicle exceeds a predetermined threshold, that is, a turning angle increasing operation is underway.

If none of these operations has been detected, the collision mitigation controller 10 determines that a straight steering operation is underway.

The output of a steering angle sensor mounted on the own vehicle may be used to detect the above steering operations. Further, depending on data received from the ECU 50 and 51, the collision mitigation controller 10 determines that a braking operation is underway or a blinking operation is underway.

In subsequent step S310, the collision mitigation controller 10 detects the running state of the own vehicle including the vehicle speed measured by the wheel speed sensor 24. Further, the collision mitigation controller 10 calculates the relative acceleration of each collision object relative to the own vehicle using historical records of the relative speed of each collision object. Thereafter, the process proceeds to step S315.

In step S315, the collision mitigation controller 10 calculates the width (lateral length) of each collision object based on the size and shape and so on of each collision object. Further, the collision mitigation controller 10 calculates a lap ratio and an offset of each collision object based on the relative position of each collision object and the kind of each object recognized by the camera sensor 21.

Figure 5:
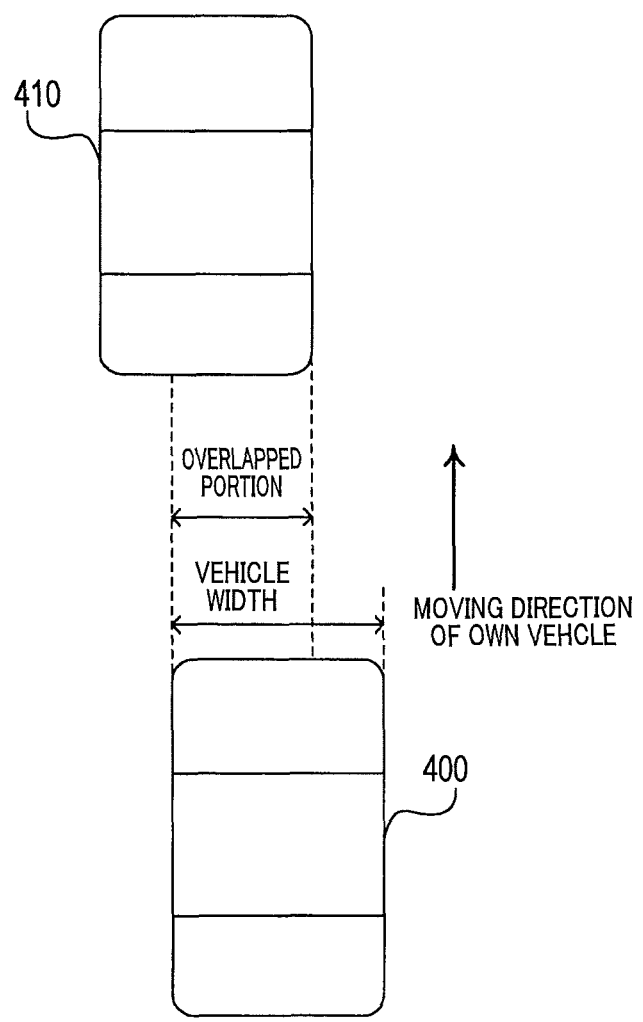
FIG. 5 is a diagram for explaining the term of "lap ratio"

Here, as shown in FIG. 5, the lap ratio is a degree by which the front end of the own vehicle 400 and the rear end of a vehicle 410 as a collision object laterally overlap with each other. More specifically, the lap ratio may be a ratio of the lateral length of the lateral overlap between the front end of the own vehicle 400 and the rear end of the vehicle 410 to the width of the own vehicle 400.

Figure 6:
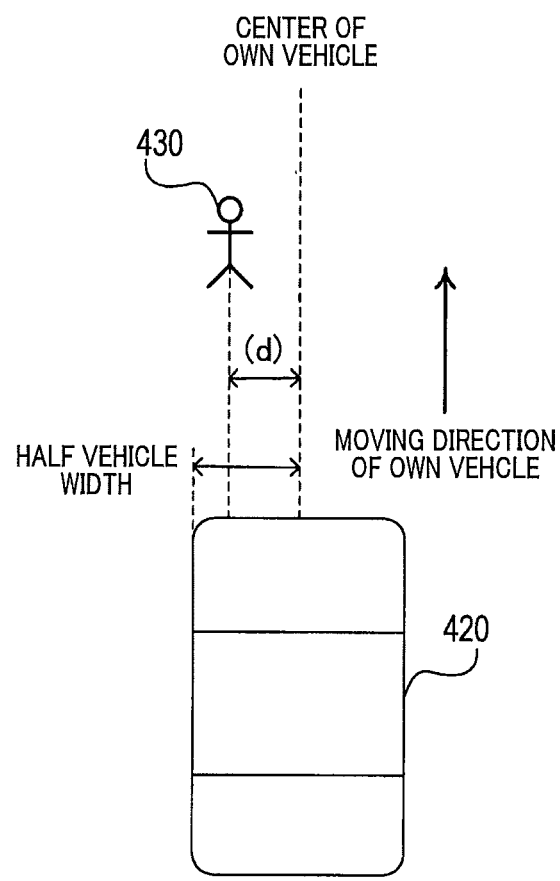
FIG. 6 is a diagram for explaining the term of "offset"
Figure 8:
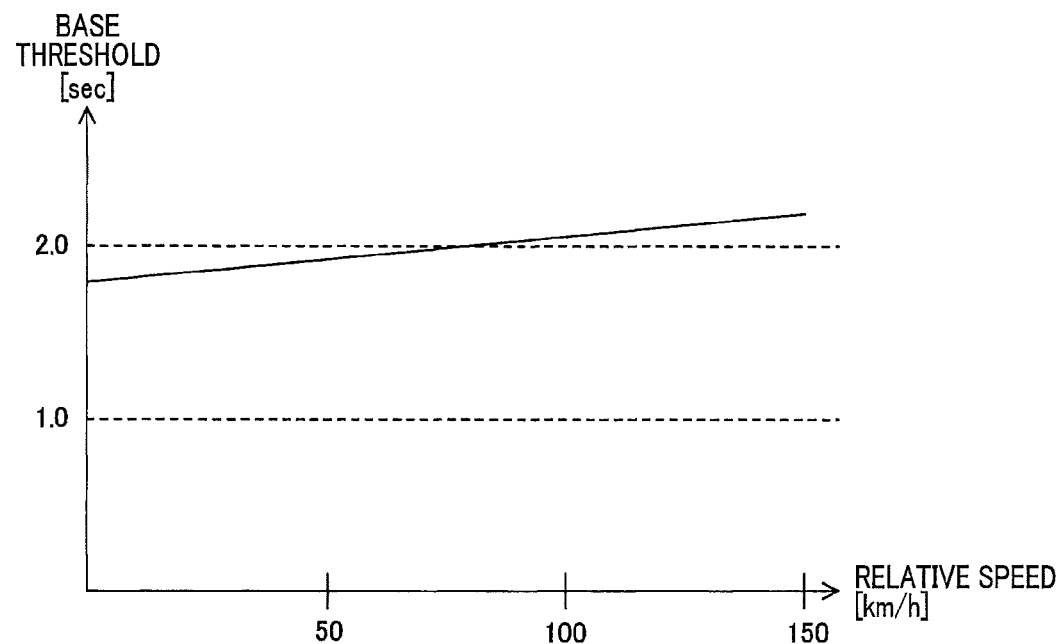
FIG. 8 is a diagram showing an example of a base table.

As shown in FIG. 6, the offset is a degree of lateral deviation between a pedestrian 430 as a collision object and the lateral center of the own vehicle 420. More specifically, the offset may be a ratio of the lateral distance (d) of the lateral center of the own vehicle 420 and the pedestrian 430 to the half of the width of the own vehicle 420.

When a collision object having been detected by the radar sensor 22 is not detected by the camera sensor 21, the kind of the collision object may be determined based on the shape of the collision object recognized by the radar sensor 22, to calculate the lap ratio and offset.

In step S320, the collision mitigation controller 10 detects the running environment of the own vehicle based on a detection result of the camera sensor 21 or radar sensor 22 and so on. More specifically, the collision mitigation controller 10 may detect, as the running environment, a determination result whether the road ahead of the own vehicle is curved or not based on the output of the camera sensor 21 or the radar sensor 22. Also, the collision mitigation controller 10 may detect, as the running environment, a determination result whether the own vehicle or a collision object is inside a white line painted on the road, or whether the own vehicle and the collision object are in the same lane. Further, the collision mitigation controller 10 may detect, as the running environment, a determination result whether the own vehicle is running in a tunnel or not, or what time of day the own vehicle is running at (daytime, evening or night).

In step S325, the collision mitigation controller 10 sets timing to start drive assist for each collision object. More specifically, the collision mitigation controller 10 determines the moving direction of each collision object using historical records of relative speed of each collision object, and reads the operation threshold for each collision object from a TTC map storing the operation thresholds for various kinds of collision objects, each of the operation thresholds having different values for different moving directions, different operation states, different running states and different running environments (to be explained in detail later).

In subsequent step S330, the collision mitigation controller 10 determines whether or not the TTC has reached the operation threshold (that is, whether timing to start drive assist has come or not) for each collision object. If the determination result in step S330 is affirmative, the process proceeds to step S335, and otherwise this process is terminated.

In step S335, the collision mitigation controller 10 controls the control object 30 so that drive assist is started when the timing to start it has come.

Next, the TTC map is explained. As shown in FIG. 7, the TTC map stores map data for the operation thresholds for different kinds of drive assist objects, each of the operation thresholds having different values for different operation states, different running states and different running environments.

In this TTC map, the item "STATIONARY OBJECT" means an object at rest on a road. This item is classified into sub-items "VEHICLE" meaning a stationary vehicle, "PEDESTRIAN" meaning a stationary pedestrian, "OTHERS" meaning any stationary object other than a vehicle and a pedestrian, and "CROSSING" meaning an object moving laterally in front of the own vehicle.

The item "PRECEDING OBJECT" means an object present in front of the own vehicle and moving in the same direction as the moving direction of the own vehicle. This item is classified into sub-items "VEHICLE" meaning a preceding vehicle of the own vehicle, and "PEDESTRIAN" meaning a pedestrian walking ahead of the own vehicle.

The item "ONCOMING OBJECT" means an object present in front of the own vehicle and approaching the own vehicle. This item is classified into sub-items "VEHICLE" meaning a vehicle which is in front of the own vehicle and approaching the own vehicle, and "PEDESTRIAN" meaning a pedestrian who is in front of the own vehicle and approaching the own vehicle.

Further, the TTC map includes items "BASE TABLE", "OPERATION STATE", "RUNNING STATE" and "RUNNING ENVIRONMENT". The item "BASE TABLE" includes base tables "A-1" to "H-1" provided corresponding to the above described different drive assist objects. Each of these base tables defines a relationship between a base threshold used as a basis for determining the operation threshold and the relative speed of the drive assist object.

To set the start timing, one of these base tables corresponding to the kind of a detected drive assist object (collision object) is selected, and the base threshold is calculated based on the selected base table and the relative speed of the drive assist object.

Figure 9:
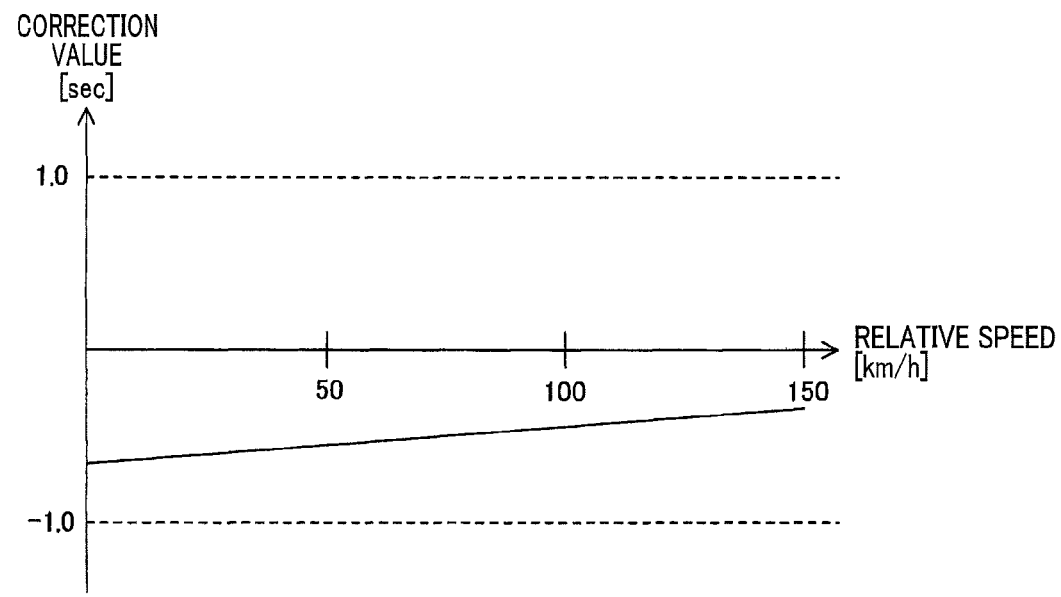
FIG. 9 is a diagram showing an example of a correction table.

Further, each of the items "OPERATION STATE", "RUNNING STATE" and "RUNNING ENVIRONMENT" includes correction tables ("A-2" to ""H-2", . . . "A-10" to "H-10". As shown in FIG. 9, Each of these correction tables shows a relationship between a correction value and the relative speed of a corresponding one of the drive assist objects.

To set the start timing, one or more of the correction tables which corresponds to the present operation state, running state, running environment and the kind of the detected drive assist object is selected from the TTC map, and the correction value corresponding to the relative speed is read from the selected correction table. When two or more of the collection tables are selected, the sum of the correction values read from these tables is calculated as a combined correction value.

The operation threshold is calculated to be the sum of the base threshold and the correction value. When two or more of the collection tables are selected, the operation threshold is calculated to be the sum of the base threshold and the combined correction value. As shown in FIG. 7, the item "OPERATION STATE" is classified into sub-items "STRAIGHT STEERING OPERATION", "WOBBLING STEERING OPERATION", "CONSTANT STEERING OPERATION", "TURNING ANGLE INCREASING OPERATION", "BRAKING OPERATION" and "BLINKING OPERATION". These sub-items are provided corresponding to the respective states detected in step S305.

One or more of these sub-items which corresponds to the detected operation state(s) is selected, and the correction table(s) corresponding to the selected sub-item(s) is selected.

As described in the foregoing, the PCS 1 is configured to set the operation threshold such that timing to start drive assist is later when the own vehicle is steered not to run straight compared to when the own vehicle is steered to run straight. Accordingly, the correction values defined by the correction tables corresponding to the sub-items "WOBBLING STEERING OPERATION", "CONSTANT STEERING ANGLE OPERATION" and "TURNING ANGLE INCREASING OPERATION" are smaller than the correction value defined by the correction table corresponding to the sub-item "STRAIGHT STEERING OPERATION".

Further, as described in the foregoing, the PCS 1 is configured to set the operation threshold such that timing to start drive assist is late when a braking operation or a blinking operation is underway compared to when they are not underway. Accordingly, the correction values defined by the correction tables corresponding to the sub-items "BRAKING OPERATION" and "BLINKING OPERATION" are negative.

As shown in FIG. 7, the item "RUNNING STATE" of the TCC map includes a sub-item "RELATIVE SPEED≤X" which means a running state in which the relative acceleration between the own vehicle and the drive assist object is greater than or equal to a predetermined threshold value. When the own vehicle is in such a running state, the correction table corresponding to this sub-item and the kind of the drive assist object is selected.

Other than the above described correction tables, a correction table for a running state in which the relative speed between the own vehicle and the drive assist object is greater than or equal to a predetermined threshold value may be provided. As shown in FIG. 7, the item "RUNNING ENVIRONMENT" of the TCC map is classified into sub-terms "CURVE AHEAD" meaning that the road ahead of the own vehicle is curved and "WHITE LINE RECOGNIZED" meaning that the own vehicle and the drive assist object are in the same lane. When the running environment of the own vehicle is the same as any one of these states, a corresponding correction table is selected.

The base tables and correction tables corresponding to the sub-item "VEHICLE" may be prepared so as to define the relationship between the base threshold and the relative speed for each of different values of the lap ratio, or a relationship between the correction value and the relative speed for each of different values of the lap ratio. Further, the base tables and correction tables corresponding to the sub-item "PEDESTRIAN" may be prepared so as to define the relationship between the base threshold and the relative speed for each of different values of the offset, or a relationship between the correction value and the relative speed for each of different values of the offset.

In these cases, the relationship between the base threshold and the relative speed for a given value of the lap ratio with the drive assist object (vehicle), or the relationship between the correction value and the relative speed for a given value of the offset with the drive assist object (pedestrian) may be determined using the selected base table or correction table. Thereafter, the base threshold or correction value may be determined from the determined relationship.

Figure 10:
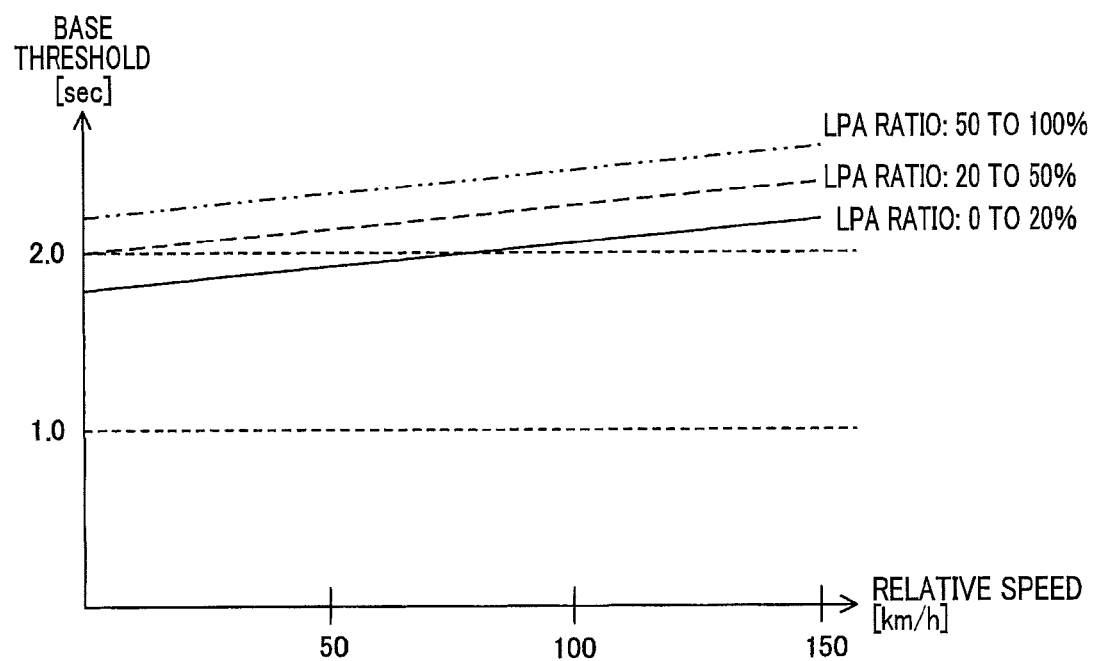
FIG. 10 is a diagram showing an example of a base table which defines base threshold values for each of different values of the lap ratio.

FIG. 10 shows an example of the base table which shows a relationship between the base threshold and the relative speed for each of different ranges of the lap ratio. In the base table of this example, a relationship between the base threshold and the relative speed are defined for each of the lap ratio ranges of 0% to 20%, 20% to 50% and 50% to 100%. According to this base table, since the base threshold decreases with the decrease of the lap ratio for the same relative speed, the start timing is set to be later when the lap ratio is low compared to when the lap ratio is high.

The TTC map may include a base table which defines a relationship between the base threshold and the relative speed for each of different ranges of the offset. The different ranges of the offset may include a range of 0 to ¼, a range of ¼ to ½ and a range of ½ to 1.

In this case, the base threshold for a case where the offset is small (or where the distance between a collision object and the lateral center of the own vehicle is small) maybe set large compared to a case where the offset is large (or where the distance between the collision object and the lateral center of the own vehicle is large) for the same relative speed, so that the start timing is set to be later when the offset is large compared to when the offset is small.

The correction tables corresponding to the sub-item "VEHICLE" may be prepared so as to define the correction values differently for different values of the lap ratio. Likewise, the correction tables corresponding to the sub-item "PEDESTRIAN" may be prepared so as to define the correction values differently for different values of the offset.

The above described embodiment of the present invention provides the following advantages. According to the PCS 1, when a wobbling steering operation or a constant steering angle operation or a steering angle increasing operation is underway, the drive assist start timing is set to be late.

Accordingly, when an object outside the road comes to be located in front of the own vehicle as a result of performing such steering operations, and is detected to be a collision object, since unnecessary drive assist can be suppressed, it is possible to prevent excessive annoyance caused to the vehicle driver.

When a braking operation or a blinking operation is underway, it can be assumed that the vehicle driver is correctly perceiving the environment and driving the own vehicle appropriately.

According to the PCS 1 of the above embodiment, since timing to start drive assist is set to be later in such situation, it is possible to prevent the vehicle driver from being annoyed too much when the vehicle driver drives the own vehicle with appropriate intention and purpose.

The PCS 1 of this embodiment sets the TTC for each of detected collision objects based on their relative positions relative to the own vehicle, and performs drive assist if the TTC reaches the operation threshold for each of the respective collision objects. The operation threshold is set in accordance with the operation state, running state and running environment of the own vehicle so that the drive assist start timing can be set appropriately.

When a detected collision object is a vehicle, the operation threshold is set in accordance with the lap ratio between this vehicle and the own vehicle. When a detected collision object is a pedestrian, the operation threshold is set in accordance with the offset between this pedestrian and the own vehicle. Hence, according to this embodiment, it is possible to set the drive assist start timing appropriately depending on the positional relationship between the own vehicle and a detected collision object.

Other Embodiments (1) The PCS 1 of the above embodiment is configured to detect a collision object using both the camera sensor 21 and the radar sensor 22. However, the PCS1 may be configured to detect a collision object using one of the camera sensor 21 and the radar sensor 22, or using a sensor other than a radar and a camera.

(2) The TCC map may be prepared differently for different destinations (regions or countries) where the PCS 1 is used. Further, the TCC map may be prepared differently for different vehicle types or sizes.

The PCS 1 may be configured to select among from different TCC maps in accordance with its destination or type or size of a vehicle using the PCS 1.

Correspondence between the above described embodiment and the claims:

The object detecting section corresponds to steps S100 to S120. The operation state detecting section corresponds to step S305. The running state detecting section corresponds to step S310. The object detecting section corresponds to step S315. The timing setting section corresponds to step S325. The drive assisting section corresponds to step S335.

The above explained preferred embodiments are exemplary of the invention of the present application which is described solely by the claims appended below. It should be understood that modifications of the preferred embodiments may be made as would occur to one of skill in the art.

What is claimed is:

1. A collision mitigation apparatus comprising:
   a collision mitigation controller including a central processing unit (CPU) that:
   detects a collision object present in front of an own vehicle on which the collision mitigation apparatus is mounted and determines a type of the collision object from a plurality of prescribed types of collision objects;
   actuates a control object to perform drive assist for avoiding a collision between the collision object detected by the collision mitigation controller and the own vehicle or mitigating damage to the own vehicle due to the collision;
   determines which of prescribed operation states the own vehicle is in;
   sets a start timing to start the drive assist by the collision mitigation controller in accordance with the operation state detected by the collision mitigation controller; and
   map data including a base table provided corresponding to each of the plurality of prescribed types of collision objects, in which a base threshold for setting the start timing for each of the plurality of prescribed types of collision objects is stored, and a correction table provided corresponding to each of the prescribed operation states, in which a correction value for setting the start timing for each of the prescribed operation states is stored;
   a camera sensor for taking an image ahead of the own vehicle and a radar sensor configured to emit electromagnetic waves ahead of the own vehicle and receive a reflected version of the electromagnetic waves,
   the collision mitigation controller being configured to set an area centered around a position of the collision object obtained by the camera sensor as a camera detection area and to set a predetermined area centered around a position of the collision object obtained by the radar sensor as a radar detection area;
   the collision mitigation controller being configured to detect the collision object and determine the type of the collision object using both the camera sensor and the radar sensor when an area of an overlapped portion between the camera detection area and the radar detection area exceeds a predetermined value, and otherwise detect the collision object and determine the type of the collision object using one of the camera sensor and the radar sensor;
   wherein the collision mitigation controller sets the start timing based on the base threshold read from the base table corresponding to the determined type of the collision object, and the correction value read from the correction table corresponding to the determined operation state;
   and wherein, when the collision mitigation controller detects the collision object and determines the type of the collision object using both the camera sensor and the radar sensor, the collision mitigation controller determines the position of the collision object based on a direction to the collision object from the own vehicle detected by the camera sensor and a distance to the collision object from the own vehicle in a front-back direction of the own vehicle detected by the radar sensor.

2. The collision mitigation apparatus according to claim 1, wherein the collision mitigation controller sets the start timing to be later when the collision mitigation controller detects that the own vehicle is in a not-straight running state where the own vehicle is operated so as not to run straight compared to when the collision mitigation controller detects that the own vehicle is in a straight running state where the own vehicle is operated so as to run straight.

3. The collision mitigation apparatus according to claim 2, wherein the collision mitigation controller determines that the own vehicle is in the not-straight running state if an amount of variation per unit time of a steering angle of the own vehicle exceeds a predetermined threshold, or the steering angle exceeds a predetermined threshold, or an increase or decrease rate of the steering angle exceeds a predetermined threshold.

4. The collision mitigation apparatus according to claim 1, wherein the collision mitigation controller sets the start timing to be later when at least one of a blinker of the own vehicle and a brake device of the own vehicle is in operation compared to when neither of the blinker and the brake device is in operation.

5. The collision mitigation apparatus according to claim 1, wherein the collision mitigation controller detects a running state of the own vehicle, the collision mitigation controller being configured to set the start timing taking into account the running state of the own vehicle detected by the collision mitigation controller.

6. The collision mitigation apparatus according to claim 1, wherein the collision mitigation controller detects a positional relationship between the own vehicle and the collision object, the collision mitigation controller being configured to set the start timing taking into account the positional relationship detected by the collision mitigation controller.

7. The collision mitigation apparatus according to claim 6, wherein the collision mitigation controller detects, as the positional relationship, a distance in a lateral direction between the own vehicle and the collision object, and the collision mitigation controller sets the start timing taking into account the distance in the lateral direction between the own vehicle and the collision object.

8. The collision mitigation apparatus according to claim 6, wherein the collision mitigation controller detects a lateral positional relationship between the own vehicle and the collision object and a lateral length of the collision object, the collision mitigation controller being configured to set the start timing taking into account the lateral positional relationship and the lateral length detected by the collision mitigation controller.

9. The collision mitigation apparatus according to claim 8, wherein the collision mitigation controller determines a degree by which the own vehicle and the collision object overlap with each other in a lateral direction based on the lateral positional relationship between the own vehicle and the collision object and the lateral length of the collision object, and sets the start timing taking into account the degree.

\* \* \* \* \*